(12) United States Patent  
Agha et al.

(10) Patent No.: US 7,657,730 B2  
(45) Date of Patent: Feb. 2, 2010

(54) INITIALIZATION AFTER A POWER INTERRUPTION

(75) Inventors: Salim Ahmed Agha, Rochester, MN (US); Gary Dean Anderson, Austin, TX (US); Wayne Allan Britson, Rochester, MN (US); Brent William Jacobs, Rochester, MN (US); William Thomas Truskowski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 11/456,102

(22) Filed: Jul. 7, 2006

(65) Prior Publication Data

US 2008/0010445 A1    Jan. 10, 2008

(51) Int. Cl.
G06F 9/00 (2006.01)
G06F 9/24 (2006.01)
G06F 15/177 (2006.01)
(52) U.S. Cl. .......................................................... 713/1
(58) Field of Classification Search ...................... 713/1
See application file for complete search history.

(56) References Cited

U.S. PATENT DOCUMENTS

| 6,051,437 A * | 4/2000 | Luo et al. .................... 436/172 |
| 6,681,336 B1 * | 1/2004 | Nakazato et al. ............ 713/322 |
| 2006/0200276 A1 * | 9/2006 | Sayama et al. ................. 701/1 |

* cited by examiner

*Primary Examiner*—Thomas Lee  
*Assistant Examiner*—Mohammed H Rehman  
(74) *Attorney, Agent, or Firm*—Dugan & Dugan, PC (57) ABSTRACT

In response to the start of an initialization sequence at a service processor, if power to a main processor was interrupted at a most-recent time that an operating system executed on the main processor, power to the main processor is turned on, the operating system is started executing on the main processor, data from the non-volatile memory of the service processor is provided to the operating system, and the service processor is reset, which restarts the initialization sequence. If the power to the main processor was not interrupted at the most-recent time that the operating system executed on the main processor, and if the operating system is currently executing on the main processor, a monitoring function is started in the service processor, which monitors for errors at a computer system.

20 Claims, 6 Drawing Sheets

INITIALIZATION AFTER A POWER INTERRUPTION

FIELD

An embodiment of the invention generally relates to computer systems and more specifically relates to the initialization of a computer system by a service processor after a power interruption.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. The software executes on a type of hardware called a processor.

Modern computer systems often have more than one processor, and one or more of the processors may be a service processor, which is an auxiliary processor that executes specialized control code to manage system initial program loads (IPLs) and to monitor, diagnose, and configure the hardware of the computer system. In recent years, the role of the service processor has expanded to provide even more advanced RAS (Reliability, Availability, and Serviceability) and system management functions.

These additional functions often increases the time required for the service processor to perform its most basic function: to power on and initialize the computer system. Under situations such as a temporary power failure, users often prefer to have the computer system powered on, initialized, and running as quickly as possible, with the additional service processor function being a secondary priority. Current techniques attempt to address the problem of increased initialization time by either reducing the advanced functions that the service processor provides or by spending more money on additional backup power supplies, in an attempt to prevent the computer system from losing power and needing re-initialization.

Thus, what is needed is a solution that reduces initialization time while still providing advanced service processor function at an acceptable cost.

SUMMARY

A method, apparatus, system, and signal-bearing medium are provided. In an embodiment, in response to the start of an initialization sequence, if power to a main processor of a computer system was interrupted at a most-recent time that an operating system executed on the main processor, power to the main processor is turned on, the operating system is started executing on the main processor, data from the non-volatile memory of a service processor is provided to the operating system, and the service processor is reset, which restarts the initialization sequence. If the power to the main processor was not interrupted at the most-recent time that the operating system executed on the main processor, and if the operating system is currently executing on the main processor, a monitoring function is started in the service processor, which monitors for errors at the computer system. If power to the main processor was not interrupted at the most-recent time that the operating system executed on the main processor, and if the operating system is not currently executing on the main processor, power is turned on to the main processor, the operating system is started executing on the main processor, the monitoring function at the service processor is started, data is determined based on the hardware of the computer system, and the data is saved to the non-volatile memory of the service processor. In this way, a service processor may provide both a normal initialization sequence during which the operating system is started and full functions of the service processor are provided, and an alternate initialization sequence, used following a power interruption, in which the operating system is started, but the full functions of the service processor are deferred until after the operating system is executing.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
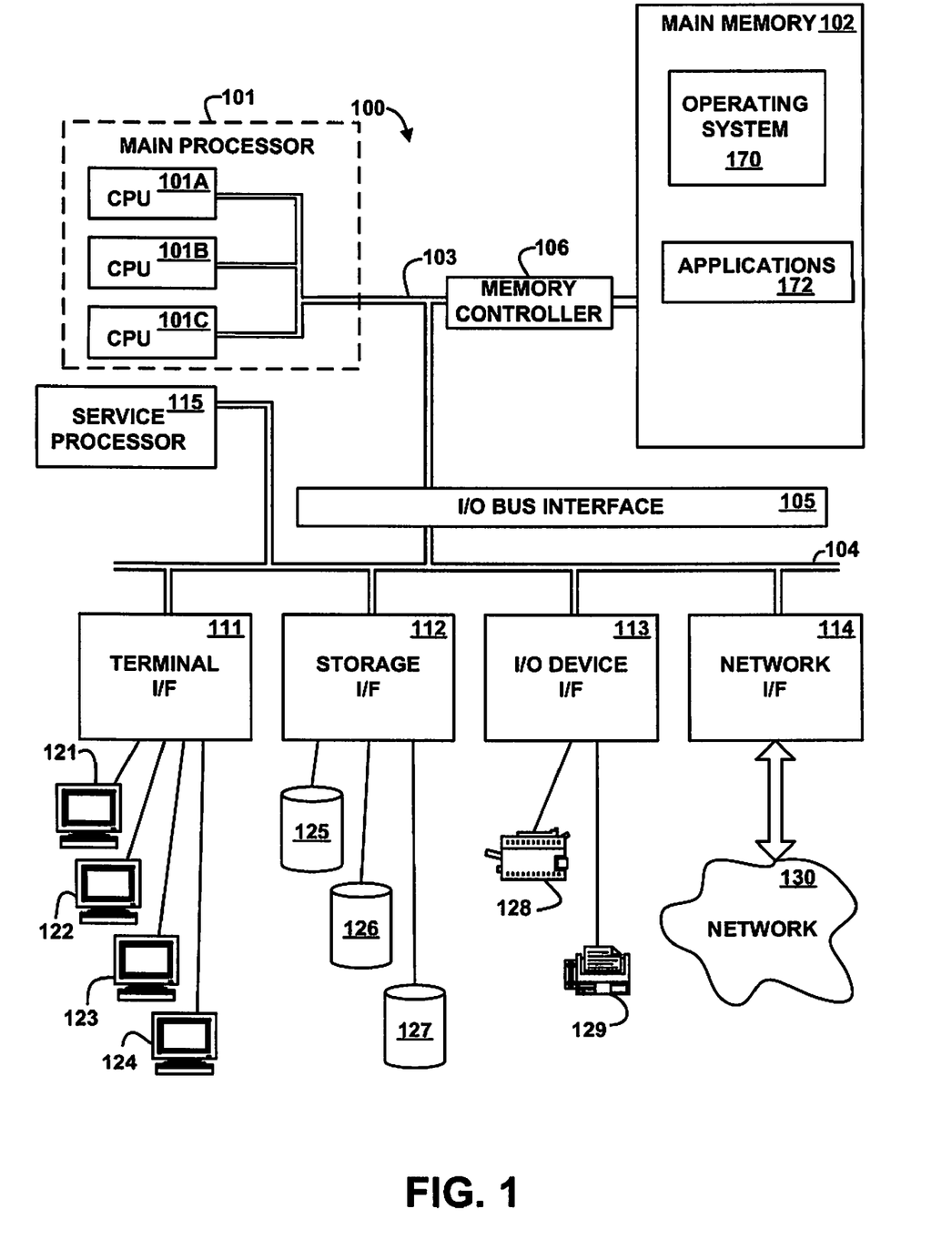
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computer system.

The major components of the computer system 100 include one or more main processors 101, a main memory 102, a memory controller 106, a terminal interface 111, a storage interface 112, an I/O (Input/Output) device interface 113, communications/network interfaces 114, and a service processor 115, all of which are coupled for inter-component communication via a memory bus 103, an I/O bus 104, and an I/O bus interface unit 105.

The computer system 100 contains one or more general-purpose programmable central processing units (CPUs) 101A, 101B, and 101C, herein generically referred to as the main processor 101. In an embodiment, the computer system 100 contains multiple processors 101A, 101B, and 101C, typical of a relatively large system; but, in another embodiment the computer system 100 may alternatively be a single CPU system. Each main processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 stores or encodes an operating system 170 and applications 172. Although the operating system 170 and the applications 172 are illustrated as being contained within the main memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the operating system 170 and the applications 172 are illustrated as being contained within the main memory 102, these elements are not necessarily all completely contained in the same storage device at the same time. Further, although the operating system 170 and the applications 172 are illustrated as being separate entities, in other embodiments some of them, portions of some of them, or both of them may be packaged together.

The operating system 170 is the program that, after being initially loaded into the computer system 100 and started executing on the main processor 101 by the service processor 115, manages all the other programs (e.g., the applications 172) in the computer system 100. The applications 172 make use of the operating system 170 by making requests for services, e.g., through a defined application program interface (API). In an embodiment, users may also be able to interact directly with the operating system 170 through a user interface (e.g., via the terminals 121, 122, 123, or 124) such as a command language or a graphical user interface. The operating system 170 performs basic tasks, such as recognizing input from input devices, sending output to output devices, managing files and directories, and controlling peripheral devices such as disk drives 125, 126, and 127 and printers 128. In various embodiments, the operating system 170 may further manage multi-user operations (more than one user accessing the computer system 100 concurrently), multi-processing operations (running a program on more than one processor 101), multi-tasking operations (running more than one program concurrently), and multi-threading operations (running different parts of a single program concurrently). In an embodiment, the computer system 100 may include multiple operating systems 170, which execute at different times or execute concurrently via partitioning under control of a hypervisor.

In an embodiment, the operating system 170 may be implemented using the i50S operating system available from International Business Machines Corporation, but in other embodiments the operating system 170 may be Linux, AIX, UNIX, Microsoft Windows, or any appropriate operating system. The operating system 170 and the applications 172 include instructions capable of executing on the main processor 101 or statements capable of being interpreted by instructions that execute on the main processor 101. In various embodiments, the applications 172 may be user applications or third party applications.

The memory bus 103 provides a data communication path for transferring data among the main processor 101, the main memory 102 via the memory controller 106, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102 via the memory controller 106, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The service processor 115 is connected to the I/O bus 104. In other embodiments, the service processor 115 may be coupled to the various other hardware components in the computer 100 in a manner other than through the I/O bus 104. The service processor 115 is an auxiliary processor that executes specialized control code to manage system initial program loads (IPLs) and to monitor, diagnose, and configure the hardware of the computer system 100. For example, the service processor 115 may monitor the environment and health of one or more main processors 101A, 101B, and 101C and their associated subsystems, load firmware images, control firmware configurations such as logical partitioning characteristics, and connect to a terminal (121, 122, 123, or 124) that provides system management function interfaces. In the event of an actual or predicted problem with a main processor 101 or a subsystem (e.g., the main memory 102, the terminal interface 111, the storage interface 112, the I/O device interface 113, and the communications/network interfaces 114), the service processor 115 may alert a system administrator and/or correct the problem. The service processor 115 is further described below with reference to FIG. 2.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 and the network 130 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

Figure 2:
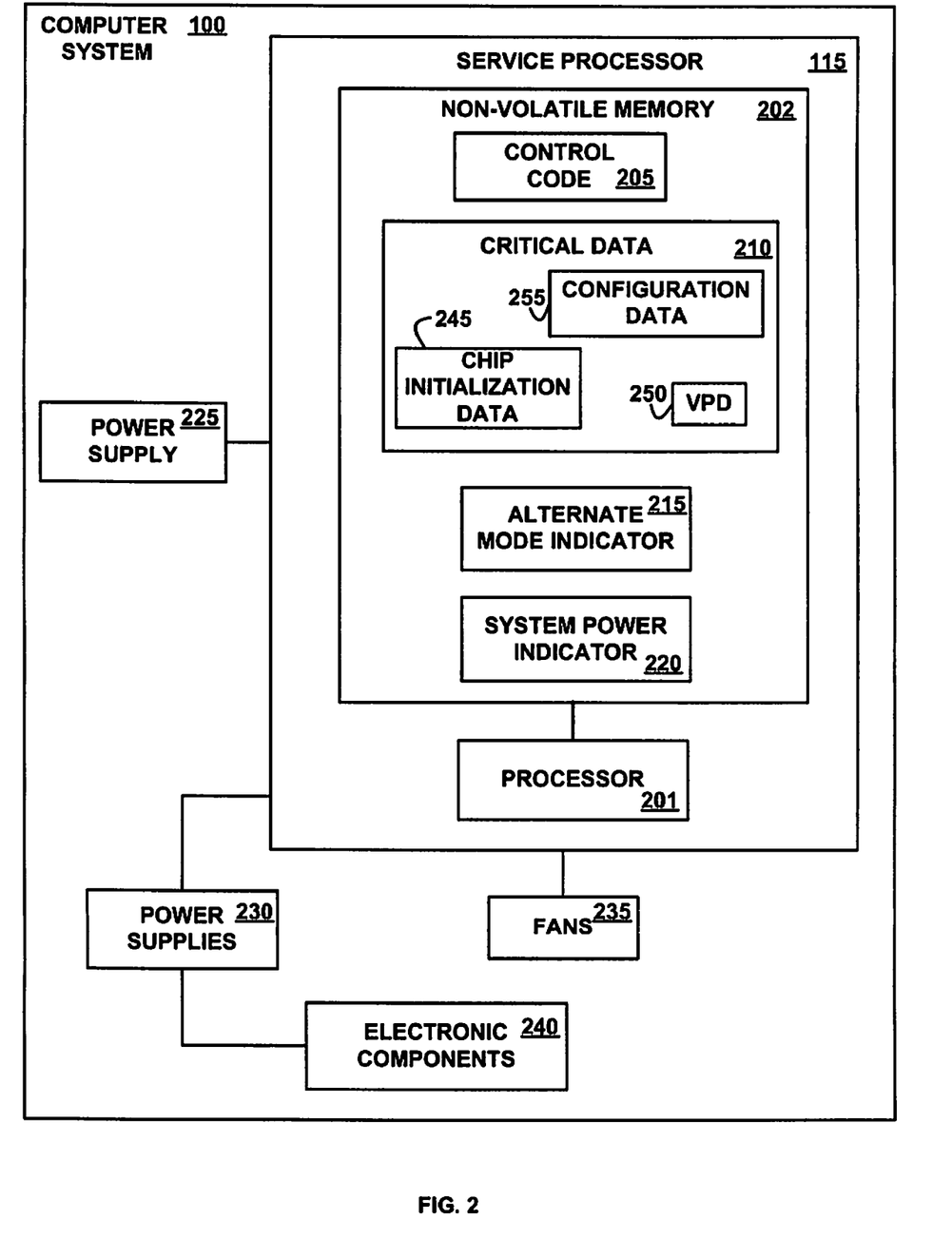
FIG. 2 depicts a block diagram of selected components of the example system, according to an embodiment of the invention.

FIG. 2 depicts a block diagram of selected components of the computer system 100, according to an embodiment of the invention. The selected components of the computer system 100 include the service processor 115, power supplies 225 and 230, fans 235, and electronic components 240. The service processor 115 is connected to and receives electrical power from the power supply 225. The power supply 225 provides standby power to the service processor 115, meaning that the service processor 115 receives power from the power supply 225 as soon as utility power is applied to the system's line cord. The service processor 115 is further connected to and controls the power supplies 230 and the fans 235. The power supplies 230 are connected to and provide electrical power to the electronic components 240 of the computer system 100, which may include some, any, or all of the processors 101, the main memory 102, the memory bus 103, the I/O bus 104, the I/O bus interface unit 105, the memory controller 106, the terminal interface 111, the storage interface 112, the I/O device interface 113, the communications/network interfaces 114, the terminals 121, 122, 123, and 124, the storage devices 125, 126, and 127, the printer 128, and the fax machine 129, as previously described above with reference to FIG. 1. The fans 235 provide air flow and cooling for the computer system 100.

The service processor 115 includes a processor 201 and non-volatile memory 202. The processor 201 is analogous to the main processor 101. The non-volatile memory 202 is a random-access semiconductor memory for storing or encoding data and programs. The non-volatile memory 202 retains its contents in the absence of electrical power. The non-volatile memory 202 includes control code 205, critical data 210, an alternate mode indicator 215, and a system power indicator 220.

In an embodiment, the control code 205 includes instructions capable of executing on the processor 201 or statements capable of being interpreted by instructions executing on the processor 201 to perform the functions as further described below with reference to FIGS. 3, 4, 5, and 6. In another embodiment, the control code 205 may be implemented in microcode. In another embodiment, the control code 205 may be implemented in hardware via logic gates and/or other appropriate hardware techniques.

In an embodiment, the critical data 210 may include some or all of chip initialization data 245, vital product data 250, and system configuration data 255. Chip initialization data 245 is data used to initialize the operation of chips, such as the main processor 101, the I/O bus interface 105, or the memory controller 106. The vital product data (VPD) 250 enables the computer system 100 or a component of the computer system 100 to be identified, administered and/or managed. The vital product data 250 may be information about the computer system 100 itself, information about a component that is stored in the main memory 102 (e.g., the applications 172), or information about a component that is an electronic device, such as the processors 101, the main memory 102, the memory bus 103, the I/O bus 104, the I/O bus interface unit 105, the memory controller 106, the terminal interface 111, the storage interface 112, the I/O device interface 113, the communications/network interfaces 114, the terminals 121, 122, 123, and 124, the storage devices 125, 126, and 127, the printer 128, and the fax machine 129. Typical vital product data information includes a product model number, a unique serial number, a product release level, a maintenance level, and/or other information specific to the type of the product or component.

The system configuration data 255 is data used by the operating system 170 or a hypervisor that manages partitions of the computer system 100, data that describes physical address ranges used by the operating system 170, or user-defined settings for system policies, such as a firmware update policy or an indication whether the computer system 100 is managed by a hardware management console.

The alternate mode indicator 215 indicates whether the computer system 100 is executing in normal mode, i.e., whether the operating system 170 is executing on the main processor 101 and the full function of the service processor 115 (including a monitoring function) is executing. The system power indicator 220 indicates whether power is being supplied to the computer system 100 and to the main processor 101. Thus, if both the alternate mode indicator 215 and the system power indicator 220 are on at the time the initialization sequence of the service processor 115 starts, then power was interrupted at a most-recent time (the last time) that the operating system 170 executed on the main processor 101. Power is interrupted if electrical power from the power supplies 230 to the electronic components 240 is lost while the operating system 170 is still executing on the main processor 101. A power interruption from the power supplies 230 to the electronic components 240 implies that a loss of utility power has occurred, causing a power interruption from the power supply 225 to the service processor 115. A power interruption is different from a normal power off sequence, in which the operating system 170 stops executing prior to the power supplies 230 being turned off.

The various software components illustrated in FIGS. 1 and 2 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 and/or 201 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processors 101 and/or 201. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, non-volatile memory 202, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

Figure 3:
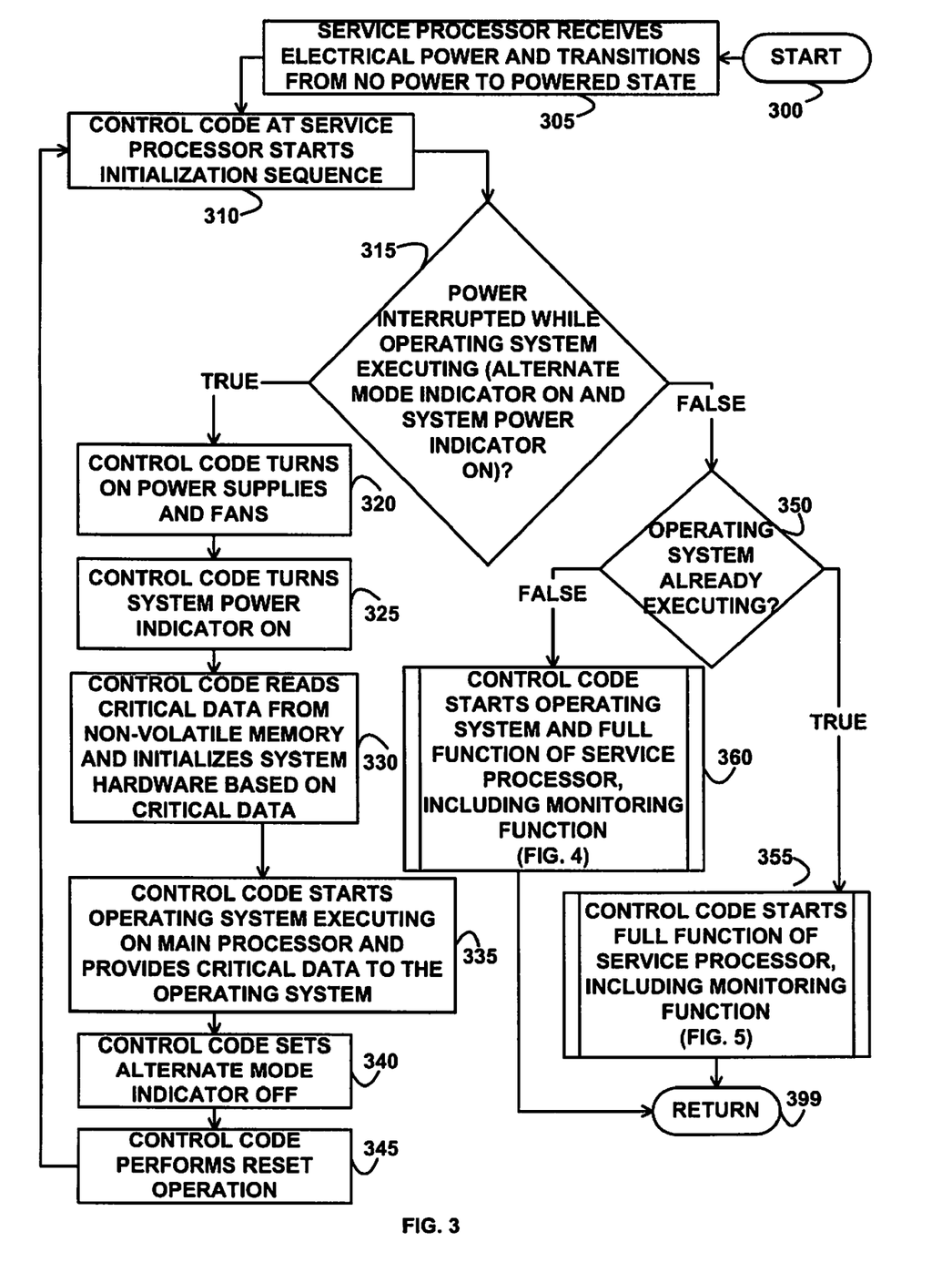
FIG. 3 depicts a flowchart of an example processing for a service processor initialization sequence, according to an embodiment of the invention.

FIG. 3 depicts a flowchart of a example processing for a service processor initialization sequence, according to an embodiment of the invention. Control begins at block 300. Control then continues to block 305 where the service processor 115 receives electrical power from the power supply 225 and transitions from a state of not receiving electrical power to receiving electrical power. Control then continues to block 310 where the control code 205 starts executing on the processor 201 and begins an initialization or boot sequence. Control then continues to block 315 where the control code 205 determines whether power to the main processor 101 was interrupted or lost at a most-recent time that the operating system 170 executed on the main processor 101 by determining whether both the alternate mode indicator 215 and the system power indicator 220 are on. Power is interrupted or lost if electrical power from the power supplies 230 to the main processor 101 is lost prior to the operating system 170 shutting down, ending execution, or completing its termination sequence. A loss of electrical power from the power supplies 230 to the main processor 101 also implies that electrical power from the power supply 225 to the service processor 115 is lost.

If the determination at block 315 is true, then power to the main processor 101 was interrupted at a most-recent time that the operating system 170 executed on the main processor 101 (both the alternate mode indicator 215 and the system power indicator 220 are on), so control continues to block 320 where the control code 205 turns on the power supplies 230 and the fans 235. Control then continues to block 325 where the control code 205 turns the system power indicator 220 on, indicating that electrical power is supplied to the electronic components 240, such as the main processor 101. Control then continues to block 330 where the control code 205 reads critical data 210 (the chip initialization data 245, the vital product data 250, and the system configuration data 255)

from the non-volatile memory 202 of the service processor 115 and initializes the system hardware (e.g., the electronic components 240) based on the critical data 210, e.g., by sending information from the critical data 210 to the system hardware.

Control then continues to block 335 where the control code 205 starts the operating system 170 executing on the main processor 101 and provides the critical data 210 to the operating system 170. The operating system 170 uses the critical data 210 to configure and control the system hardware. Control then continues to block 340 where the control code 205 sets the alternate mode indicator 215 off, which indicates that the alternate mode initialization sequence is complete. Control then continues to block 345 where the control code 205 performs a reset operation, which resets the service processor and causes control to return to block 310, where the initialization sequence of the service processor 115 starts again. Thus, the blocks 320, 325, 330, 335, 340, and 345 represent an alternate mode initialization sequence of the service processor 115, in which the service processor 115 starts the operating system 170 executing on the main processor 101 and initializes the operating system 170 from the saved critical data 210 in the non-volatile memory 202, but the full functions of the service processor 115 are not started. The alternate mode initialization sequence follows a power interruption (an interruption of power from the power supplies 230 while the operating system 170 is executing on the main processor 101) and not the normal power off sequence, which is further described below with reference to FIG. 6.

If the determination at block 315 is false, then power to the main processor 101 was not interrupted at a most-recent time that the operating system 170 executed on the main processor 101 (at least one of the alternate mode indicator 215 and the system power indicator 220 are off), so control continues to block 350 where the control code 205 determines if the operating system 170 is currently executing (is already executing) on the main processor 101. The operating system 170 is currently executing if the service processor 115 previously performed the alternate initialization sequence represented by blocks 320, 325, 330, 335, 340, and 345.

If the determination at block 350 is true, then the operating system 170 is currently executing (is already executing) on the main processor 101 and the alternate initialization sequence was previously performed, so control continues to block 355 where the control code 205 starts the full function of the service processor 115 (including a monitor function that monitors for errors at the computer system 100), as further described below with reference to FIG. 5. Control then continues to block 399 where the logic of FIG. 3 returns. Thus, the operation of block 350 followed by block 355 represents an normal mode initialization sequence that follows an alternate mode initialization sequence, in which the operating system 170 does not need to be started because it was previously started as part of the alternate mode initialization sequence.

If the determination at block 350 is false, then the operating system 170 is not currently executing (is not already executing) on the main processor 101, so control continues to block 360 where the control code 205 starts the operating system 170 executing on the main processor 101 and starts the full function of the service processor including a monitoring function that monitors for errors at the computer system 100, as further described below with reference to FIG. 4. Control then continues to block 399 where the logic of FIG. 3 returns. Thus, the operation of the combination of block 350 followed by block 360 represents a normal initialization sequence that follows a normal power off sequence (as further described below with reference to FIG. 6), but does not follow an alternate mode initialization sequence. The operating system 170 needs to be started (at block 360) because the alternate mode initialization sequence was not previously performed in the time since power was received (as previously described above with reference to block 305).

Figure 4:
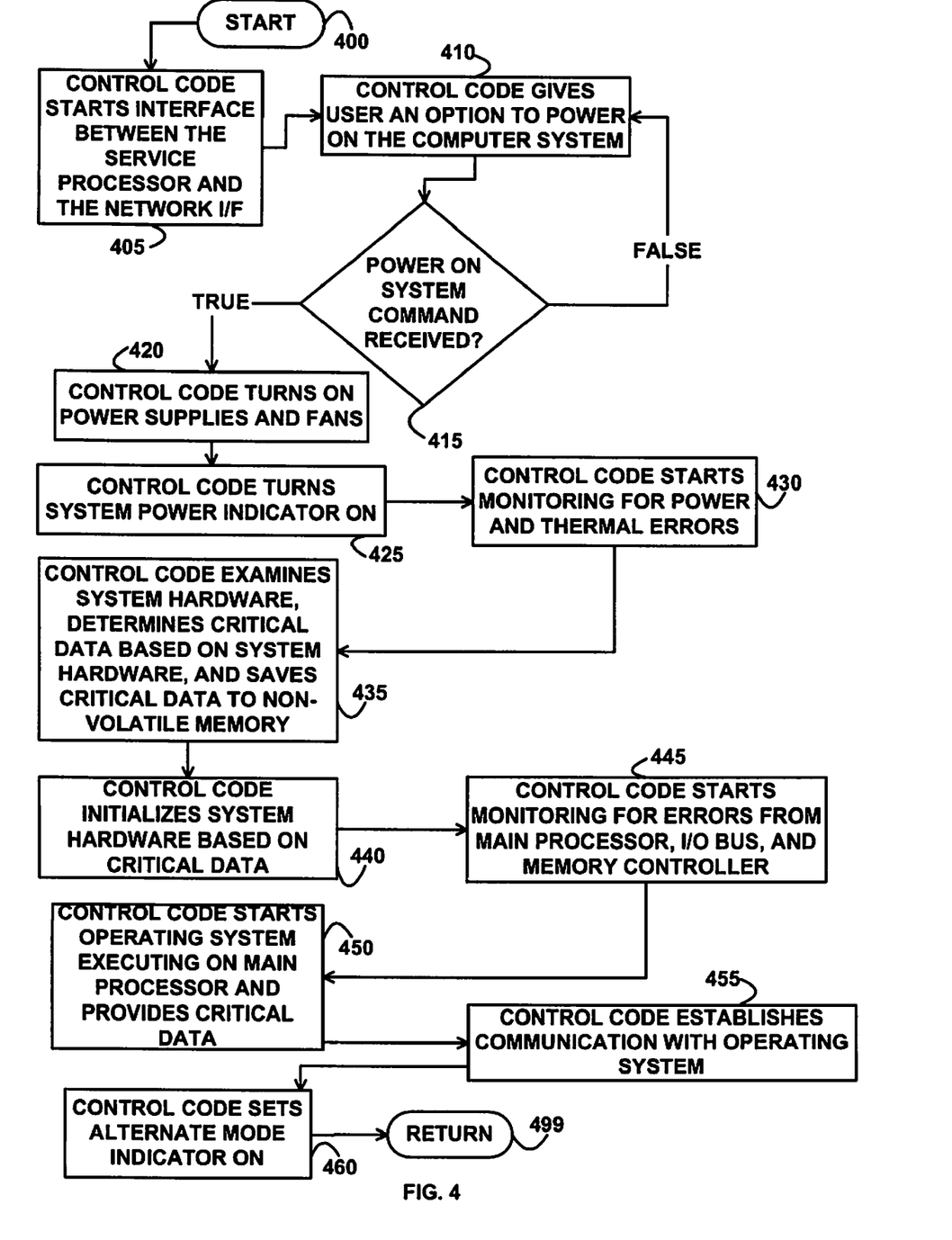
FIG. 4 depicts a flowchart of example processing for starting an operating system, according to an embodiment of the invention.

FIG. 4 depicts a flowchart of example processing for starting the execution of the operating system 170 and the full function of the service processor 115, according to an embodiment of the invention. Control begins at block 400. Control then continues to block 405 where the control code 205 starts a communication interface between the service processor 115 and the network interface 114. Control then continues to block 410 where the control code 205 gives the user an option to power on the computer system 100, e.g., by displaying an option on a user interface presented via the terminal 121, 122, 123, or 124. In another embodiment, the power on system command may be received via the network 130. Control then continues to block 415 where the control code 205 determines whether a power on system command was received from the user interface.

If the determination at block 415 is true, then a power on system command was received via the user interface, so control continues to block 420 where the control code 205 turns on the power supplies 230 (which supply power to the electronic components 240 of the computer system 100, including the main processor 101) and the fans 235. Control then continues to block 425 where the control code 205 turns the system power indicator 220 on, indicating that power is on to the computer system 100.

Control then continues to block 430 where the control code 205 starts a monitoring function in the control code 205 that monitors for power and thermal errors at the computer system 100. Control then continues to block 435 where the control code 205 examines the hardware components of the computer system 100, determines critical data 210 based on the examination of the computer system hardware, and saves the critical data 210 to the non-volatile memory 202 as the chip initialization data 245, the vital product data 250, and the system configuration data 255. Control then continues to block 440 where the control code 205 initializes the system hardware of the computer system 100 using the critical data 210. For example, the control code 205 stores values indicated in the chip initialization data 245, the vital product data 250, and the configuration data 255 into the system hardware (the electronic components 240) of the computer system 100.

Control then continues to block 445 where the control code 205 starts a monitoring function in the control code 205 that monitors for errors from the main processor 101, the I/O bus 104, and the memory controller 106. Control then continues to block 450 where the control code 205 starts the operating system 170 executing on the main processor 101 and provides the critical data 210 (the chip initialization data 245, the vital product data 250, and the configuration data 255) to the operating system 170. The operating system 170 uses the critical data 210 to control the computer system 100. Control then continues to block 455 where the control code 205 establishes communication with the operating system 170. Control then continues to block 460 where the control code 205 sets the alternate mode indicator 215 on, which indicates that the operating system 170 and the full function of the service processor 115 are executing. Control then continues to block 499 where the logic of FIG. 4 returns.

If the determination at block 415 is false, then a power on system command was not received via the user interface, so control returns to block 410, as previously described above.

Figure 5:
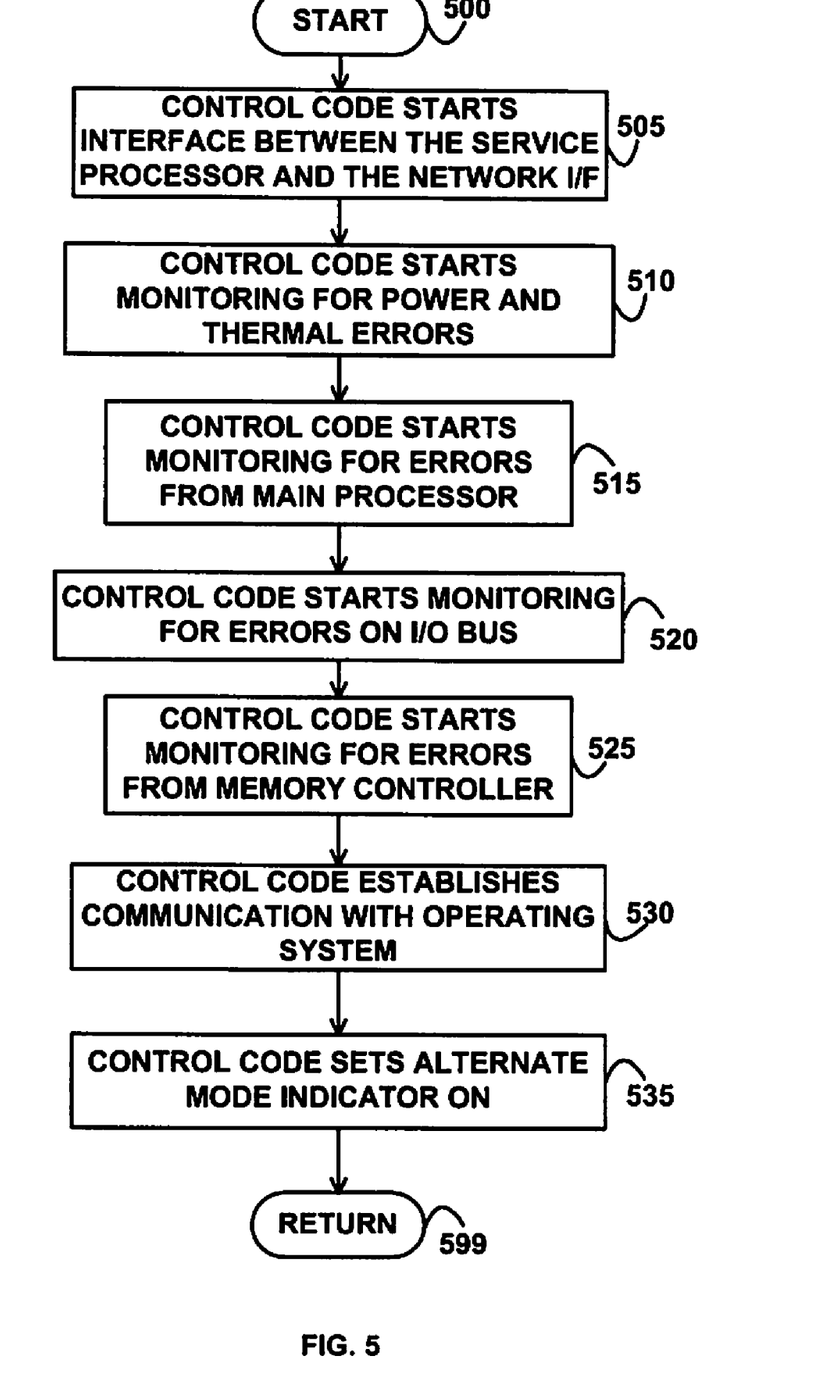
FIG. 5 depicts a flowchart of example processing for starting the full function of a service processor, according to an embodiment of the invention.

FIG. 5 depicts a flowchart of example processing for starting the full function of the service processor 115, according to an embodiment of the invention. Control begins at block 500. Control then continues to block 505 where the control code 205 starts an interface between the service processor 115 and the network interface 114. Control then continues to block 510 where the control code 205 starts a monitoring function in the control code 205 that monitors for power and thermal errors at the computer system 100. Control then continues to block 515 where the control code 205 starts a monitoring function in the control code 205 that monitors for errors from the main processor 101. Control then continues to block 520 where the control code 205 starts a monitoring function in the control code 205 that monitors for errors from the I/O bus 104. Control then continues to block 525 where the control code 205 starts a monitoring function in the control code 205 that monitors for errors from the memory controller 106. Control then continues to block 530 where the control code 205 establishes communication with the operating system 170. Control then continues to block 535 where the control code 205 sets the alternate mode indicator 215 on, which indicates that the operating system 170 and the full function of the service processor 115 are executing. Control then continues to block 599 where the logic of FIG. 5 returns.

Figure 6:
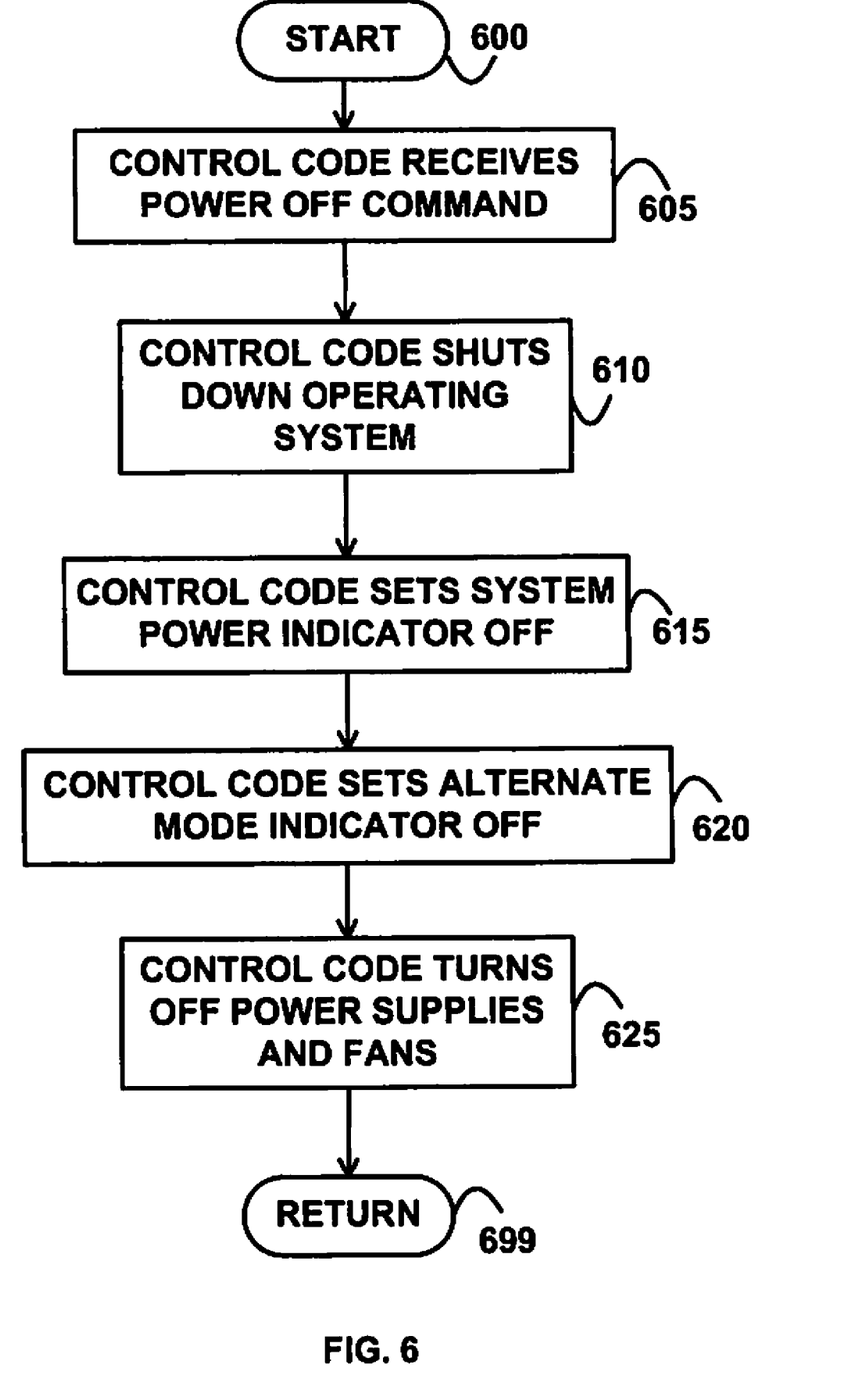
FIG. 6 depicts a flowchart of example processing for powering off a computer system.

FIG. 6 depicts a flowchart of example processing for powering off the computer system 100. Control begins at block 600. Control then continues to block 605 where the control code 205 receives a power off command, e.g. from a user interface presented on a terminal 121, 122, 123, or 124 or from the network 130. Control then continues to block 610 where the control code 205 shuts down the operating system 170, causing the operating system 170 to stop executing on the main processor 101. Control then continues to block 615 where the control code 205 sets the system power indicator 220 off. Control then continues to block 620 where the control code 205 sets the alternate mode indicator 215 off. Control then continues to block 625 where the control code 205 turns off the fans 235 and the power supplies 230, which stops electrical power to the main processor 101. The power supply 225 continues to power the service processor 115 since utility power has not been lost. Control then continues to block 699 where the logic of FIG. 6 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   starting an initialization sequence at a service processor;
   in response to the starting, if power to a main processor was interrupted at a most-recent time that an operating system executed on the main processor, turning on the power to the main processor and starting the operating system executing on the main processor; and
   if the power to the main processor was not interrupted at the most-recent time that the operating system executed on the main processor, and if the operating system is currently executing on the main processor, starting a monitoring function at the service processor, wherein the monitoring function monitors for errors.

2. The method of claim 1, further comprising:
   if the power to the main processor was interrupted at the most-recent time that the operating system executed on the main processor, resetting the service processor after the starting the operating system, wherein the starting the initialization sequence is performed in response to the resetting.

3. The method of claim 1, further comprising:
   receiving power at the service processor, wherein the starting the initialization sequence is performed in response to the receiving the power.

4. The method of claim 1, further comprising:
   if the power to the main processor was not interrupted at the most-recent time that the operating system executed on the main processor, and if the operating system is not currently executing on the main processor,
   turning on the power to the main processor and starting the operating system executing on the main processor, and
   starting the monitoring function at the service processor.

5. The method of claim 1, wherein the monitoring function monitors for errors at a computer system that comprises the main processor.

6. The method of claim 4, further comprising:
   if the power to the main processor was not interrupted at the most-recent time that the operating system executed on the main processor, and if the operating system is not currently executing on the main processor, determining data based on hardware of the computer system and saving the data to non-volatile memory of the service processor.

7. The method of claim 6, further comprising:
   if the power to a main processor was interrupted at the most-recent time that the operating system executed on the main processor, providing the data from the non-volatile memory of the service processor to the operating system.

8. A signal-bearing medium encoded with instructions, wherein the instructions when executed comprise:
   starting an initialization sequence at a service processor;
   in response to the starting, if power to a main processor was interrupted at a most-recent time that an operating system executed on the main processor, turning on the power to the main processor and starting the operating system executing on the main processor; and
   if the power to the main processor was not interrupted at the most-recent time that the operating system executed on the main processor, and if the operating system is currently executing on the main processor, starting a monitoring function in the service processor, wherein the monitoring function monitors for errors.

9. The signal-bearing medium of claim 8, further comprising:
if the power to the main processor was interrupted at the most-recent time that the operating system executed on the main processor, resetting the service processor after the starting the operating system, wherein the starting the initialization sequence is performed in response to the resetting.

10. The signal-bearing medium of claim 8, further comprising:
receiving power at the service processor, wherein the starting the initialization sequence is performed in response to the receiving the power.

11. The signal-bearing medium of claim 8, further comprising:
if the power to the main processor was not interrupted at the most-recent time that the operating system executed on the main processor, and if the operating system is not currently executing on the main processor,
turning on the power to the main processor and starting the operating system executing on the main processor, and
starting the monitoring function at the service processor.

12. The signal-bearing medium of claim 8, wherein the monitoring function monitors for errors at a computer system that comprises the main processor.

13. The signal-bearing medium of claim 11, further comprising:
if the power to the main processor was not interrupted at the most-recent time that the operating system executed on the main processor, and if the operating system is not currently executing on the main processor, determining data based on hardware of the computer system and saving the data to non-volatile memory of the service processor.

14. The signal-bearing medium of claim 13, further comprising:
if the power to a main processor was interrupted at the most-recent time that the operating system executed on the main processor, providing the data from the non-volatile memory of the service processor to the operating system.

15. A method for configuring a computer system, comprising:
configuring the computer system to start an initialization sequence at a service processor;
configuring the computer system to, in response to the start of the initialization sequence, if power to a main processor was interrupted at a most-recent time that an operating system executed on the main processor, turn on the power to the main processor and start the operating system executing on the main processor; and
configuring the computer system to, if the power to the main processor was not interrupted at the most-recent time that the operating system executed on the main processor, and if the operating system is currently executing on the main processor, start a monitoring function in the service processor, wherein the monitoring function monitors for errors at the computer system, wherein the computer system comprises the main processor.

16. The method of claim 15, further comprising:
configuring the computer system to, if the power to the main processor was interrupted at the most-recent time that the operating system executed on the main processor, reset the service processor after the starting the operating system, wherein the start of the initialization sequence is performed in response to the reset.

17. The method of claim 15, further comprising:
configuring the computer system to receive power at the service processor, wherein the start of the initialization sequence is performed in response to the power.

18. The method of claim 15, further comprising:
configuring the computer system to, if the power to the main processor was not interrupted at the most-recent time that the operating system executed on the main processor, and if the operating system is not currently executing on the main processor,
turn on the power to the main processor and start the operating system executing on the main processor, and
start the monitoring function at the service processor.

19. The method of claim 18, further comprising:
configuring the computer system to, if the power to the main processor was not interrupted at the most-recent time that the operating system executed on the main processor, and if the operating system is not currently executing on the main processor, determine data based on hardware of the computer system and save the data to non-volatile memory of the service processor.

20. The method of claim 19, further comprising:
configuring the computer system to, if the power to a main processor was interrupted at the most-recent time that the operating system executed on the main processor, provide the data from the non-volatile memory of the service processor to the operating system.

* * * * *

UNITED STATES PATENT AND TRADEMARK OFFICE
CERTIFICATE OF CORRECTION

PATENT NO.      : 7,657,730 B2                                    Page 1 of 1
APPLICATION NO. : 11/456102
DATED           : February 2, 2010
INVENTOR(S)     : Agha et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 879 days.

Signed and Sealed this

Thirtieth Day of November, 2010

David J. Kappos
*Director of the United States Patent and Trademark Office*